(12) United States Patent
Shin et al.

(10) Patent No.: US 9,965,888 B2
(45) Date of Patent: May 8, 2018

(54) METHOD AND APPARATUS FOR GENERATING AND TRAVERSING ACCELERATION STRUCTURE

(71) Applicant: Samsung Electronics Co., Ltd., Suwon-si (KR)

(72) Inventors: Youngsam Shin, Hwaseong-si (KR); Jeongsoo Park, Gwacheon-si (KR); Wonjong Lee, Seoul (KR); Jaedon Lee, Yongin-si (KR); Seokjoong Hwang, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 22 days.

(21) Appl. No.: 14/704,349

(22) Filed: May 5, 2015

(65) Prior Publication Data

US 2016/0093090 A1 Mar. 31, 2016

(30) Foreign Application Priority Data

Sep. 30, 2014 (KR) .................. 10-2014-0132015

(51) Int. Cl.
*G06T 15/06* (2011.01)
*G06T 1/20* (2006.01)
*G06T 17/00* (2006.01)

(52) U.S. Cl.
CPC .............. *G06T 15/06* (2013.01); *G06T 1/20* (2013.01); *G06T 17/005* (2013.01); *G06T 2210/12* (2013.01); *G06T 2210/21* (2013.01)

(58) Field of Classification Search
CPC ........ G06T 15/06; G06T 17/00; G06T 17/005
See application file for complete search history.

(56) References Cited

U.S. PATENT DOCUMENTS

| 8,253,730 | B1 | 8/2012 | Carr |
| 8,259,105 | B2 | 9/2012 | Wald et al. |
| 8,421,801 | B2 | 4/2013 | Salsbury et al. |
| 8,502,819 | B1 | 8/2013 | Aila et al. |
| 2009/0058859 | A1* | 3/2009 | Crawford .................. G06F 8/34 345/440 |
| 2009/0182837 | A1* | 7/2009 | Rogers .............. G06F 17/30961 709/215 |
| 2013/0265297 | A1* | 10/2013 | Mueller .................. G06T 15/20 345/419 |

(Continued)

FOREIGN PATENT DOCUMENTS

KR 10-0894136 B1 4/2009

OTHER PUBLICATIONS

Stich, Martin; 2009; Spatial Splits in Bounding Volume Hierarchies; HPG; pp. 7-13.*

(Continued)

*Primary Examiner* — Todd Buttram
(74) *Attorney, Agent, or Firm* — F. Chau & Associates, LLC

(57) ABSTRACT

Methods and apparatus for ray tracing, and methods and apparatus for generating acceleration structure or traversing acceleration structure are provided. A method of generating an acceleration structure includes assigning objects into bounding boxes, generating an acceleration structure comprising nodes and indicating inclusion relationships between the bounding boxes, and marking overlapping nodes among the nodes.

15 Claims, 15 Drawing Sheets

(56) References Cited

U.S. PATENT DOCUMENTS

| | | | |
|---|---|---|---|
| 2013/0265298 A1* | 10/2013 | Moon | G06T 15/00 |
| | | | 345/419 |
| 2014/0168238 A1 | 6/2014 | Luebke et al. | |
| 2014/0306959 A1* | 10/2014 | Ozdas | G06T 15/06 |
| | | | 345/424 |
| 2016/0029004 A1* | 1/2016 | Campbell | H04N 13/0203 |
| | | | 348/47 |
| 2016/0070820 A1* | 3/2016 | Laine | G06T 15/005 |
| | | | 707/797 |

OTHER PUBLICATIONS

Woop, Sven, et al. "Estimating Performance of a Ray-Tracing ASIC Design." *IEEE Symposium on Interactive Ray Tracing*, 2006, XP031008766, (8 pages).

Kinkelin, Martin, "GPU Volume Raycasting using Bounding Interval Hierarchies"*Masterpraktikum aus Computergraphik und Digitaler Bildverarbeitung (SS2009)*, Jan. 1, 2009, XP055263306, (15 pages).

Navratil, Paul Arthur. "Memory-Efficient, Scalable Ray Tracing." *The University of Texas at Austin*, Aug. 2010, XP055263986, (200 pages).

Extended European Search Report dated Apr. 28, 2016 in counterpart European Application No. EP 15175085.8 (14 pages).

\* cited by examiner

METHOD AND APPARATUS FOR GENERATING AND TRAVERSING ACCELERATION STRUCTURE

CROSS-REFERENCE TO RELATED APPLICATION

This application claims the benefit under 35 USC 119(a) of Korean Patent Application No. 10-2014-0132015, filed on Sep. 30, 2014, in the Korean Intellectual Property Office, the entire disclosure of which is incorporated herein by reference for all purposes.

BACKGROUND

1. Field

The following description relates to methods and apparatus of image rendering and to methods and apparatus of generating and traversing an acceleration structure.

2. Description of Related Art

Three-dimensional (3D) rendering refers to an image processing technique for extracting an image viewed from a given viewpoint of a camera from 3D object data. Ray tracing refers to a process of tracing a point where scene objects to be rendered and a ray intersect to render an image. A ray tracing method involves tracing a path of light incident along a ray passing through each pixel of an image from a view point of a camera to generate the image from 3D object data. Since physical characteristics of light, such as reflection, refraction, and transmission, may be reflected in a rendering result by using the ray tracing method, high quality images may be obtained. Accordingly, ray tracing technique is widely used in 3D rendering fields such as a movie production or an animation production in which realistic scenes are rendered.

With regard to the ray tracing method, an image is rendered by repeating a process of finding an intersection at which an object intersects with a ray and tracing a ray that is reflected or refracted from the intersection. Ray tracing includes traversal of an acceleration structure and an intersection test between a ray and a primitive. Performing the traversal and the intersection test requires a large amount of computation and a broad memory bandwidth.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of generating an acceleration structure for ray tracing involves assigning objects into bounding boxes, generating an acceleration structure comprising nodes, the acceleration structure indicating inclusion relationships between the bounding boxes, and marking overlapping nodes among the nodes.

The marking of the overlapping nodes may involve adding a flag to each of the nodes. Information as to whether child nodes of the each of the nodes overlap each other may be indicated by the flag.

In the marking of the overlapping nodes, overlap information may be indicated in the upper node closest to nodes corresponding to overlapping bounding boxes.

The general aspect of the method may further involve receiving 3D object data regarding the objects from a first non-transitory memory, and storing the acceleration structures in which the overlapping nodes are marked in a second non-transitory memory.

In another general aspect, a method of traversing an acceleration structure may involve (a) traversing to a leaf node of the acceleration structure, the leaf node intersecting ray data, and (b) determining whether a node among upper nodes of the intersected leaf node includes child nodes that overlap each other, and, in response to a determination that no node among the upper nodes includes child nodes that overlap each other, terminating the traversing, or in response to a determination that a node among the upper nodes includes child nodes that overlap each other, traversing the child nodes that overlap each other.

In operation (b), the determination as to whether a node includes child nodes overlapping each other may be made based on an overlap flag of the node.

Operation (a) may involve pushing an untraversed node to a stack and storing the untraversed node in the stack.

When the child nodes that overlap each other are traversed in the operation (b), nodes stored in the stack may be sequentially pushed out to traverse the child nodes that overlap each other in the pushed out nodes.

In the operation (b), nodes, among the pushed out nodes, that do not include overlapping child nodes may be not traversed.

In another general aspect, a device for generating an acceleration structure for ray tracing includes an acceleration structure generator configured to assign objects into bounding boxes and to generate an acceleration structure comprised of nodes, the acceleration structure indicating inclusion relationships between the bounding boxes, and an overlap marker configured to mark overlapping nodes among the nodes.

The overlap marker may add a flag to each of the nodes and may store flag information as to whether child nodes of the each of the nodes overlap each other.

The overlap marker may store overlap information at the upper node closest to nodes indicating the overlapping bounding boxes.

In another general aspect, a ray tracing core for traversing an acceleration structure includes a traverser configured to traverse a leaf node of the acceleration structure, the leaf node intersecting ray data. In response to a determination that no node among upper nodes of the intersected leaf node includes child nodes that overlap each other, the traverser may terminate traversal, and, in response to a determination that a node among the upper nodes includes child nodes that overlap each other, the traverser may traverse the child nodes that overlap each other. The traverser may include a stack for storing the nodes.

The traverser may determine whether a node includes child nodes that overlap each other based on an overlap flag of the node.

The traverser may push an untraversed node into a stack and may store the untraversed node in the stack.

When the traverser traverses the child nodes that overlap each other, the traverser sequentially may push out nodes stored in the stack to traverse the child nodes that overlap each other in the pushed out nodes.

The traverser may not traverse child nodes that do not overlap each other in the nodes pushed out from the stack.

In another general aspect, an apparatus for ray tracing includes a processor configured to generate an acceleration structure comprising nodes, and indicate an overlapping relationship according to a bounding volume hierarchy of objects at one or more nodes of the acceleration structure.

The acceleration structure may include a KD tree, and the processor may indicate the overlapping relation by adding a flag to one or more inner nodes of the KD tree.

The general aspect of the apparatus may further include a non-transitory memory configured to store the generated acceleration structure.

The general aspect of the apparatus may further include a processor core configured to render an image by traversing the generated acceleration structure, wherein the processor core uses the overlapping relationship indicated at the one or more nodes to skip a node during the traversing.

In another general aspect, a ray tracing core includes a processor configured to render an image by traversing an acceleration structure in which an overlapping relationship is marked according to a bounding volume hierarchy of objects.

The processor may be configured to skip one or more node during the traversing of the acceleration structure based on the overlapping relationship marked in the acceleration structure.

The overlapping relationship may indicate whether a node of the acceleration structure has child nodes that overlap with one another, and the overlapping relationship may be marked with an overlap flag added to the node having the child nodes.

Other features and aspects will be apparent from the following detailed description, the drawings, and the claims.

DETAILED DESCRIPTION

Figure 1:
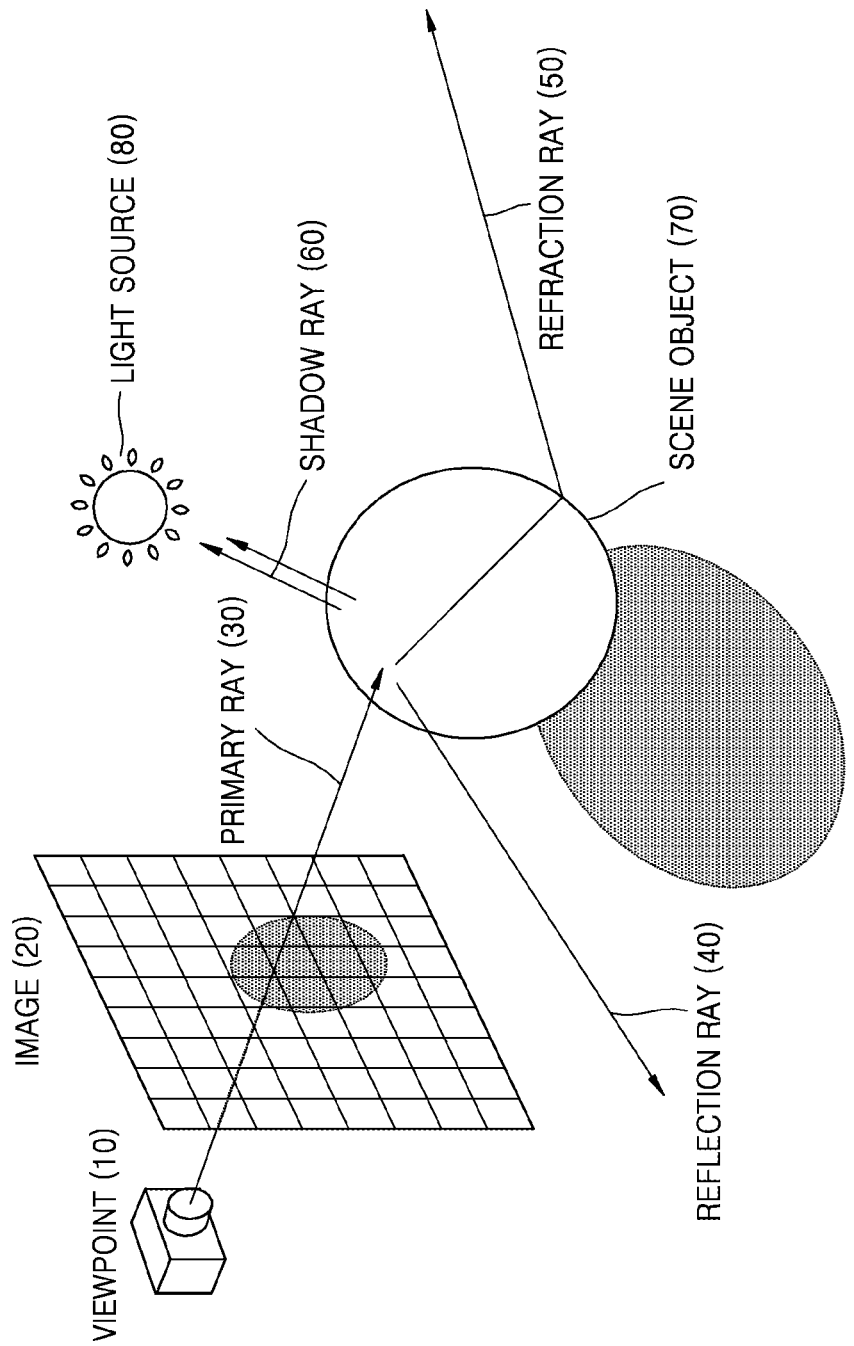
FIG. 1 is a schematic diagram illustrating an example of a ray tracing method.

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of", when preceding a list of elements, modify the entire list of elements and do not modify the individual elements of the list.

FIG. 1 is a schematic diagram for explaining a ray tracing method. Referring to FIG. 1, in three-dimensional (3D) modeling process, a ray tracing core may determine a viewpoint 10 and a location of an image 20 relative to the viewpoint 10. When the viewpoint 10 and the relative location of the image 20 are determined, the ray tracing core generates a ray originating from the viewpoint 10 with respect to each pixel of the image 20.

Elements of ray tracing will be described. A primary ray 30 is generated to originate from the viewpoint 10. The primary ray 30 intersects with a scene object 70 after passing through an area defining the image 20. At an intersection point between the primary ray 30 and the scene object 70, a reflection ray 40 and a refraction ray 50 are generated. Also, a shadow ray 60 is generated at the intersection point toward a light source 80. The reflection ray 40, the refraction ray 50, and the shadow ray 60 are referred to as secondary rays. The scene object 70 denotes an object that is to be rendered in the image 20. The scene object 70 includes a plurality of primitives.

The ray tracing core analyzes the primary ray 30, the secondary rays, and any rays derived from the secondary rays. The secondary rays may include one or more reflection ray 40, refraction ray 50, and shadow ray 60. The rays derived from the secondary rays may be referred to as tertiary rays, quaternary rays and the like. The ray tracing core determines a color value of each of pixels that form the image 20 based on the result of the analysis. The ray tracing core determines color values of each pixels by considering various characteristics of the scene object 70.

Figure 2:
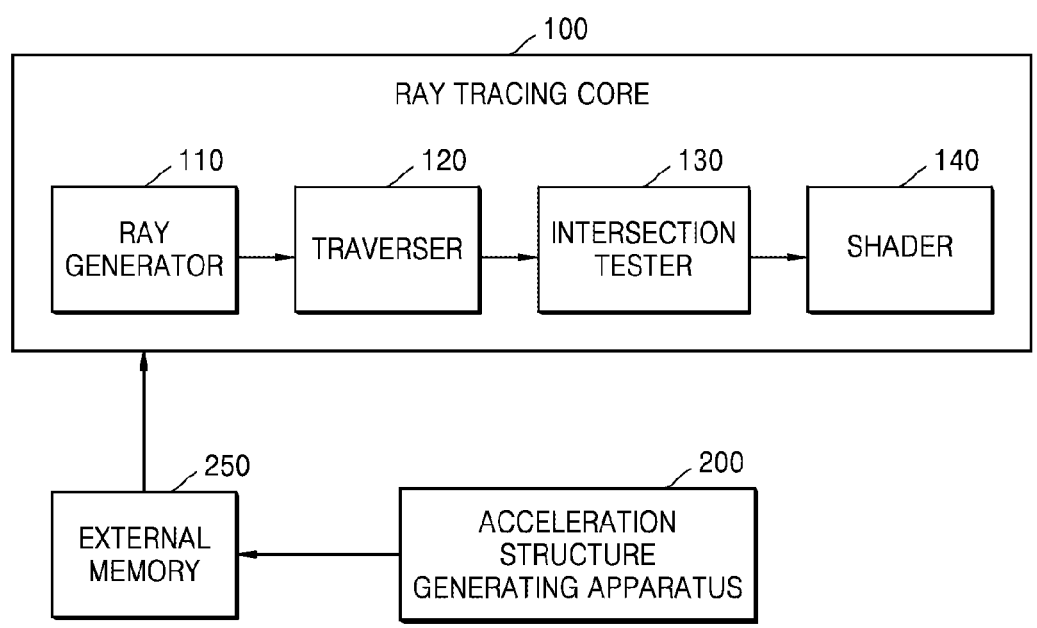
FIG. 2 is a schematic diagram illustrating an example of a ray tracing core.

FIG. 2 is a schematic diagram explaining the structure of an example of a ray tracing core 100. Referring to FIG. 2, the ray tracing core 100 includes a ray generator 110, a traverser 120, an intersection tester 130, and a shader 140. In the example illustrated in FIG. 2, the traverser 120 and the intersection tester 130 are included in the ray tracing core 100; however, the traverser 120 and the intersection tester 130 may be included separately as hardware in another example. The ray tracing core 100 may include one or more processor. The ray generator 110, the traverser 120, the intersection tester 130, and the shader 140 may each include one or more processors or memories, or may share one or more processors or memories with one another. The ray tracing core 100 illustrated in FIG. 2 includes only elements related to the current embodiment of the present disclosure. However, it will be obvious to one of ordinary skill in the art that general-use elements other than the illustrated ones in FIG. 2 may be further included in the ray tracing core 100.

The ray tracing core 100 traces an intersection point between generated rays and objects located in 3D space, and determines color values of pixels that form an image. In other words, the ray tracing core 100 searches for an intersection point between rays and objects, generates a secondary ray according to characteristics of an object at the intersection point, and determines a color value of the intersection point.

The ray tracing core 100 may use results of previous traversal and previous intersection tests to traverse an acceleration structure and to perform an intersection test. That is, the ray tracing core 100 may increase the speed of current rendering by applying results obtained from previous rendering to the current rendering.

The ray generator 110 generates a primary ray and a secondary ray. The ray tracing core 100 generates a first ray that originate from a viewpoint. The ray generator 110 generates a reflection, refraction, or shadow secondary ray at an intersection point between the primary ray and an object. Also, another secondary ray may be generated at an intersection point between the above secondary ray and the object. The ray generator 110 may generate a reflection ray, a refraction ray or a shadow ray within a preset number of times, or may determine the number of times generating a reflection ray, a refraction ray, or a shadow ray according to characteristics of an object.

The traverser 120 receives information about a ray generated by the ray generator 110. The generated ray may be a primary ray, a secondary ray, or a ray derived from the secondary ray. For example, regarding a primary ray, the traverser 120 may receive information about a viewpoint and a direction of a generated ray. Also, regarding a secondary ray, the traverser 120 may receive information about a starting point and a direction of a secondary ray. A starting point of a secondary ray denotes a point which a primary ray has hit. A viewpoint or a starting point may be expressed by coordinates, and a direction may be expressed by a vector.

The traverser 120 reads information about an acceleration structure from an external memory 250. An acceleration structure is generated by an acceleration structure generating apparatus 200, and the generated acceleration structure is stored in the external memory 250. An acceleration structure refers to a structure including position information of objects in 3D space. For example, an acceleration structure may be a K-dimensional (KD) tree or a bounding volume hierarchy (BVH). KD trees may be used to speed up intersection tests. Bounding volume hierarchies provide an acceleration scheme for ray tracing.

The traverser 120 traverses an acceleration structure to output an object or a leaf node that a ray has hit. For example, the traverser 120 searches for nodes included in an acceleration structure to output a leaf node which a ray has hit from among lowermost-ranking leaf nodes, to the intersection tester 130. In other words, the traverser 120 determines which of bounding boxes that form an acceleration structure is hit by a ray. The traverser 120 determines which object included in a bounding box is hit by a ray. Information about a hit object is stored in a traversal cache. A bounding box may denote a unit including a plurality of objects or a plurality of primitives and may be expressed in different forms according to an acceleration structure. A traversal cache denotes a memory for temporarily storing data used by the traverser 120 in traversal.

The traverser 120 may traverse an acceleration structure based on results of previous rendering. The traverser 120 may traverse an acceleration structure via the same route as previous rendering based on the result of previous rendering that is stored in a traversal cache. For example, when the traverser 120 traverses an acceleration structure regarding a generated ray, the traverser 120 may traverse a bounding box that is hit by a previous ray having the same viewpoint and the same direction as the generated ray. Also, the traverser 120 may traverse an acceleration structure by referring to a search route with respect to a previous ray.

The intersection tester 130 receives an object or a leaf node that is hit by a ray, from the traverser 120 and reads information from the external memory 250 about primitives included in a hit object. Information about the read primitives may be stored in an intersection test cache. An intersection test cache denotes a memory to temporarily store data used by the intersection tester 130 in an intersection test.

The intersection tester 130 conducts an intersection test between a ray and a primitive to output a primitive hit by a ray and an intersection point. The intersection tester 130 receives information from the traverser 120 about which object is hit by a ray and tests which primitives from among a plurality of primitives included in a hit object are hit by a ray. After the intersection tester 130 finds a primitive hit by a ray, the intersection tester 130 outputs an intersection point indicating which point of the hit primitive intersects the ray. The intersection point may be output to the shader 140 in coordinates.

The intersection tester 130 may conduct an intersection test by using results of previous rendering. The intersection tester 130 may conduct an intersection test on the same primitive as that of previous rendering based on results of previous rendering that are stored in the intersection test cache. For example, when the intersection tester 130 conducts an intersection test between a generated ray and a primitive, the intersection tester 130 may conduct an intersection test on a primitive hit by a previous ray having the same viewpoint and the same direction as the generated ray.

The shader 140 determines a color value of a pixel based on information about an intersection point, received from the intersection tester 130, and properties of a material of the intersection point. The shader 140 determines a color value of a pixel by considering a basic color of a material of the intersection point and effects due to a light source.

The ray tracing core 100 receives from the external memory 250 data needed in ray tracing. An acceleration structure generated by the acceleration structure generating apparatus 200 or geometry data indicating information about primitives is stored in the external memory 250. A primitive may be a polygon such as a triangle or a rectangle, and geometry may indicate information about a vertex and a position of primitives included in an object. According to one example, the ray tracing core includes a hardware component that may be mounted on a ray tracing chip. The ray tracing core may have, for example, a MIMD (Multiple Instructions Multiple Data) or SIMD (Single Instruction Multiple Data) architecture. The ray tracing core may include one or more processor, cache and/or other memory storages. The ray tracing core may be included in a chip such as a graphic processor, and the ray tracing chip may be capable of being coupled to an external memory that stores the acceleration structure and geometric data.

The acceleration structure generating apparatus 200 generates an acceleration structure including position information about objects in 3D space. The acceleration structure generating apparatus 200 may generate various types of acceleration structures. For example, an acceleration structure may be generated by splitting 3D space in a hierarchical tree structure, and the acceleration structure generating apparatus 200 may generate a structure indicating a relationship between objects in 3D space by applying BVH or KD tree. The acceleration structure generating apparatus 200 may determine a maximum number of primitives of a leaf node and a depth of tree and generate an acceleration structure based on the determined maximum number and the determined depth of tree.

Figure 3:
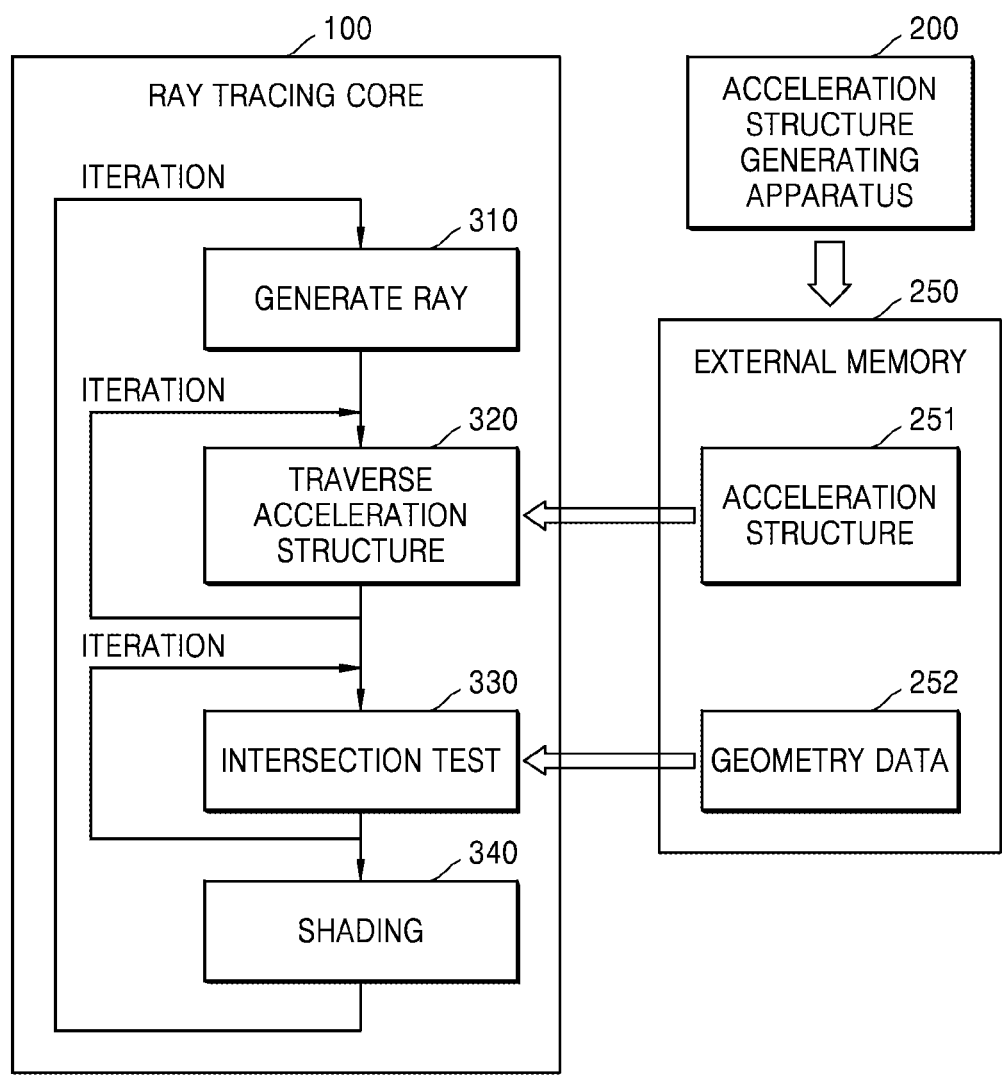
FIG. 3 is a schematic diagram illustrating an example of a ray tracing method performed by a ray tracing core.

FIG. 3 is a schematic diagram explaining a ray tracing method performed by a ray tracing core. For example, the ray tracing core may have the structure of the ray tracing core 100 illustrated in FIG. 2. Accordingly, above descriptions of the ray tracing core 100 apply to the ray tracing method illustrated in FIG. 3.

Referring to FIG. 3, an acceleration structure may be generated by an acceleration structure generating apparatus 200 and may be stored in an external memory 250 to be processed by the ray tracing core 100. In one example, the external memory 250 may be coupled to a ray tracing core included in a ray tracing chip. The external memory 250 may include the generated acceleration structure 251 in an acceleration structure memory storage and the geometry data 252 in a geometric data memory storage.

In operation 310, the ray tracing core 100 generates a ray. For example, the ray tracing core 100 generates a primary ray, a secondary ray, and rays derived from the secondary ray.

In operation 320, the ray tracing core 100 traverses an acceleration structure read out from the external memory 250. The ray tracing core 100 detects a bounding box hit by a ray, by traversing the acceleration structure 251 based on a viewpoint and a direction of generated rays and detects an object hit by a ray from among objects included in the hit bounding box. The ray tracing core 100 repeats traversing the acceleration structure 251 until an object hit is detected. For example, the ray tracing core 100 traverses an acceleration structure along a predetermined route, and in response to a determination that a leaf node on the searched route is not hit by a ray, the ray tracing core 100 traverses other routes in an acceleration structure.

The ray tracing core 100 may sequentially traverse all routes; however, the ray tracing core 100 may alternately traverse a predetermined route based on search information of a previous ray without traversing all routes. For example, the ray tracing core 100 may search for a route in which a hit leaf node is included in a previous node in the event that the previous ray had the same or similar viewpoint and the same or similar direction as a current ray.

In operation 330, the ray tracing core 100 conducts an intersection test based on geometry data 252 of primitives received from the external memory 250. The ray tracing core 100 iterates an intersection test until a primitive hit is detected. For example, the ray tracing core 100 conducts an intersection test on a primitive, and in response to any primitive being hit by a ray, the ray tracing core 100 conducts an intersection test on another primitive.

The ray tracing core 100 may sequentially conduct an intersection test on all primitives; however, the ray tracing core 100 may alternately test a predetermined primitive based on information about an intersection test of a previous ray so as to avoid conducting intersection test on all primitives. For example, the ray tracing core 100 may conduct an intersection test on a primitive that is hit by a previous ray when the previous ray and a current ray have the same or similar viewpoint and the same or similar direction.

In operation 340, the ray tracing core 100 conducts shading of a pixel based on the intersection test. After operation 340 is completed, the ray tracing core 100 proceeds to operation 310. The ray tracing core 100 iterates operations 310 through 340 with respect to all pixels that form an image.

Figure 4:
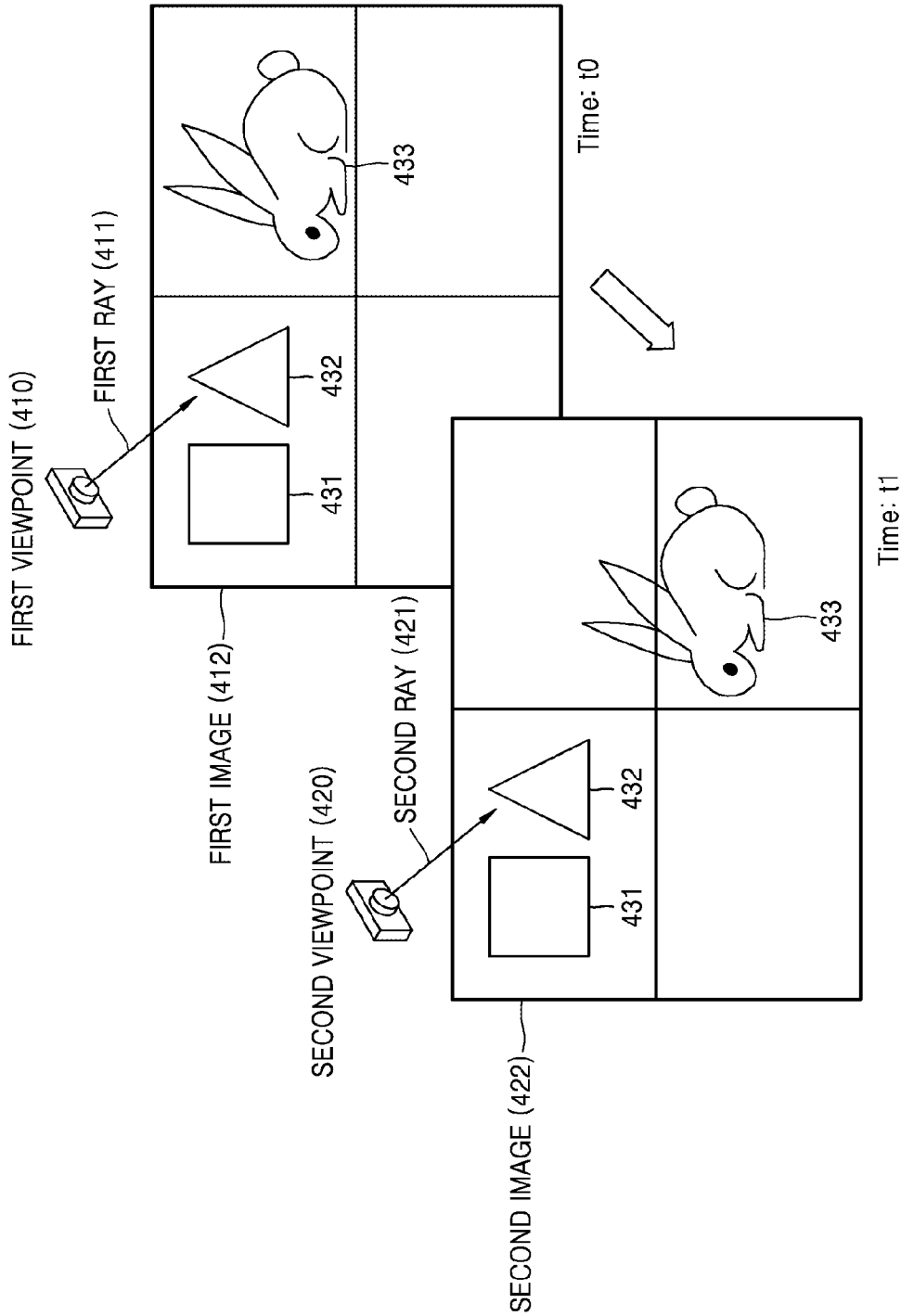
FIG. 4 is a schematic diagram illustrating an example of a method of accelerating ray tracing.

FIG. 4 is a schematic diagram explaining an example of a method of accelerating ray tracing. Referring to FIG. 4, a first image 412 is an image that is rendered at t=0, and a second image 422 is an image that is rendered at t=1. In this example, only a rabbit 433 moved between t=0 and t=1, and a rectangle 431 and a triangle 432 did not move its position. Thus, the first image 412 and the second image 422 are similar to each other with respect to the position of the rectangle 431 and the triangle 432. Accordingly, the ray tracing core 100 may render the second image 421 by using values obtained during the rendering of the first image 412. For example, when a first viewpoint 410 and a second viewpoint 420 are at the same position, and a first ray 411 and a second ray 421 are in the same direction, the ray tracing core 100 may accelerate ray tracing of the second ray 421 by applying a result of ray tracing with respect to the first ray 411. For example, the traverser 120 of the ray tracing core 100 may traverse a bounding box hit by the first ray 411 when conducting a search with respect to the second ray 421. Also, the intersection tester 130 of the ray tracing core 100 may conduct an intersection test on a triangle 432 hit by the first ray 411 during an intersection test on the second ray.

Figure 5:
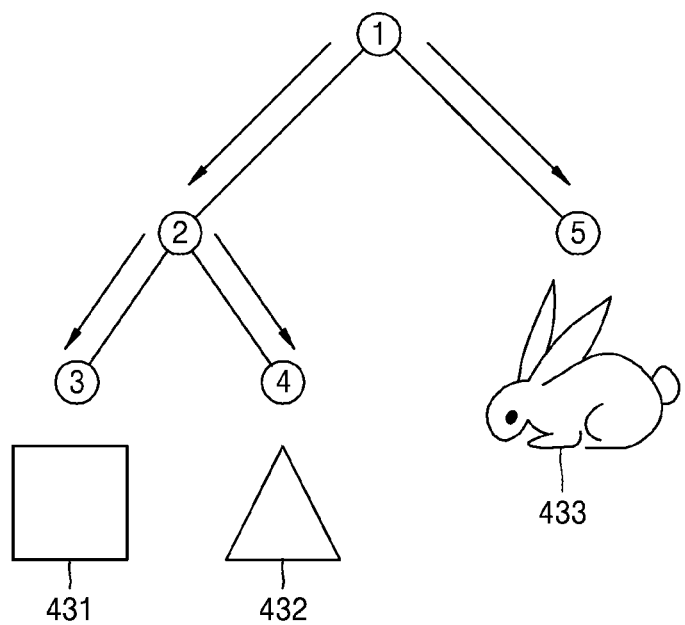
FIG. 5 is another diagram illustrating the method of accelerating ray tracing according to FIG. 4.

FIG. 5 is another schematic diagram further explaining the method of accelerating ray tracing illustrated in FIG. 4. Referring to FIG. 5, an example of an acceleration structure includes five nodes, node 1 through 5, wherein nodes 3 through 5 each are a leaf node. The acceleration structure is an example of a KD tree. A KD tree refers to a type of spatial partitioning tree that may be used for facilitating an intersection test. Node 1 is a root node or a top node. Node 2 is an inner node. The leaf nodes 3 through 5 may include a pointer to a primitive, a geometric shape or an object, such as a rectangle 431, a triangle 432 or a rabbit 433.

The traverser 120 may search an acceleration structure along three routes. First, the traverser 120 may traverse an acceleration structure along node 1, node 2, and node 3 which form a first route. Secondly, the traverser 120 may traverse an acceleration structure along node 1, node 2, and node 4, which form a second route. Thirdly, the traverser 120 may traverse an acceleration structure along node 1 and node 5, which form a third route. When the traverser 120 conducts a search with respect to the second ray 421, the traverser 120 traverses the second route via which a triangle 432 hit by the first ray 411 is searched. Accordingly, the traverser 120 may omit an operation of traversing the first route or the third route.

Figure 6:
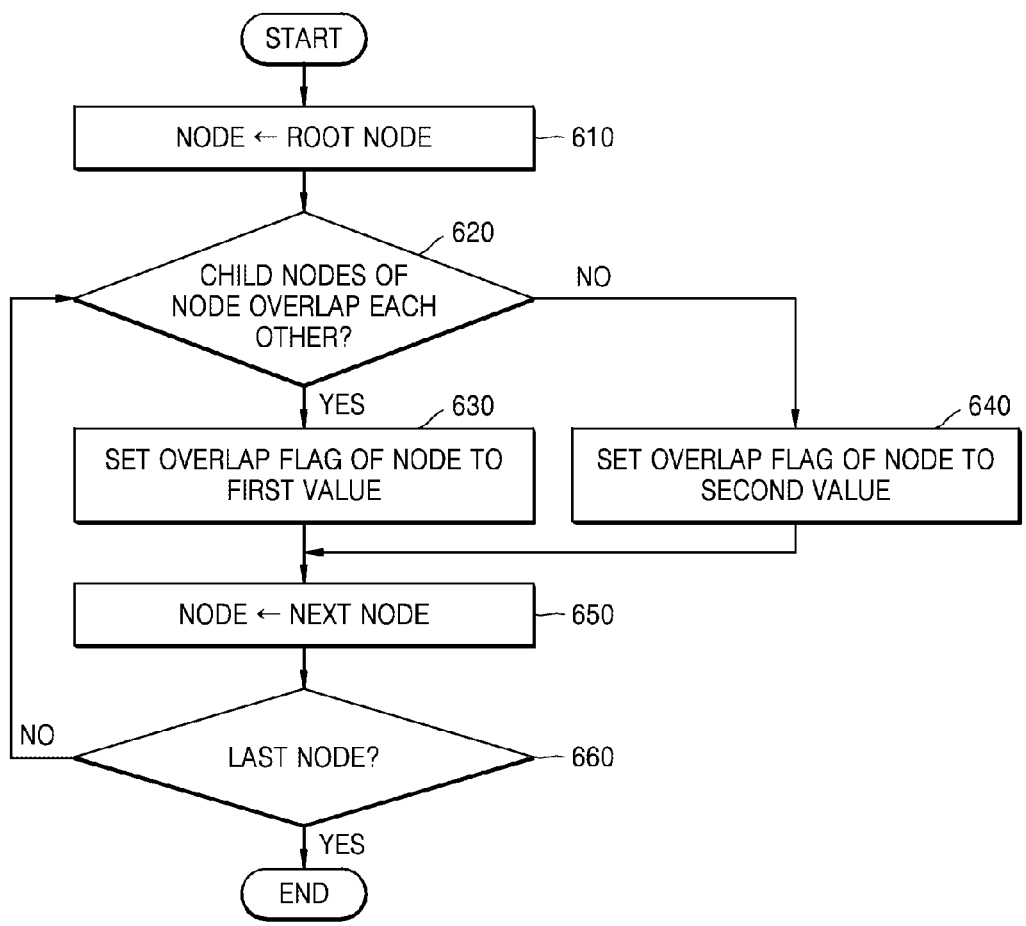
FIG. 6 is a flowchart describing an example of a method of generating an acceleration structure according to the present disclosure.

FIG. 6 is a flowchart describing an example of a method of generating an acceleration structure according to the present disclosure. Referring to FIG. 6, the acceleration structure generating apparatus 200 may generate an acceleration structure in which overlapped nodes are marked.

In an operation 610, the acceleration structure generating apparatus 200 sets a root node as the current node.

In an operation 620, the acceleration structure generating apparatus 200 determines whether child nodes of each of nodes overlap with each other. The term child node refers to the closest lower nodes to a node. The expression that nodes overlap with each other indicates that bounding boxes indicated by the nodes overlap with each other. If the child nodes of the current node overlap with each other, the method proceeds to the operation 630. If not, the method proceeds to the operation 640.

In the operation 630, the acceleration structure generating apparatus 200 sets an overlap flag of the node that includes overlapped child nodes to "0" or a first value. As a result, a node having an overlap flag set to "0" or the first value includes overlapped child nodes.

In an operation 640, the acceleration structure generating apparatus 200 sets an overlap flag of the node that does not include overlapped child nodes to "1" or a second value. As a result, a node of which overlap flag is set to "1" or the second value does not include child nodes that overlap with one another.

In an operation 650, the acceleration structure generating apparatus 200 sets a next node as the current node. The acceleration structure generating apparatus 200 performs the operations 620 through 650 with respect to every node in turn.

In an operation 660, the acceleration structure generating apparatus 200 determines whether the current node is the last node. If the node is the last node, the generation of an acceleration structure is completed. If not, the method proceeds to the operation 620.

Figure 7:
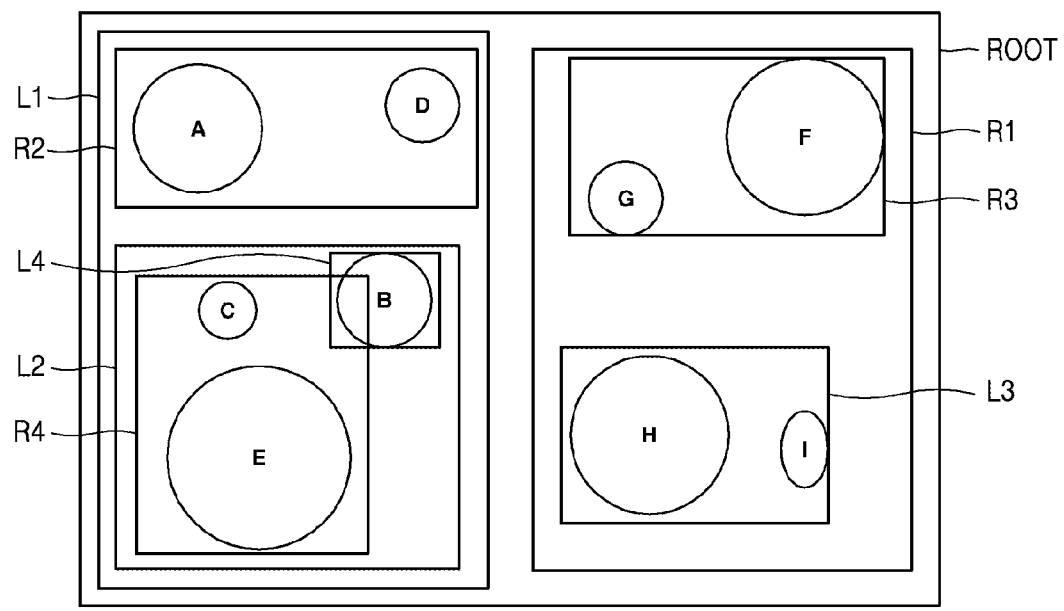
FIG. 7 is a diagram illustrating an example of a method of dividing objects into bounding boxes.

FIG. 7 is a diagram describing an example of a method of assigning objects of a scene into bounding boxes.

A bounding box for a set of objects is a closed area that completely contains the union of objects in the set. Bound boxes may be used to improve the efficiency of geometrical operations. Bounding boxes may be arranged to indicate a bounding volume hierarchy (BVH). A bounding volume hierarchy provides a scheme for constructing a tree structure in which all of the objects in a set are wrapped in bounding boxes that forms the leaf nodes of a KD tree.

Referring to FIG. 7, a bounding box ROOT denotes the uppermost bounding box. The bounding box ROOT includes all bounding boxes and corresponds to a root node in a tree structure. The bounding box ROOT includes a bounding box R1 and a bounding box L1 as the closest bounding boxes. The bounding box R1 and the bounding box L1 do not overlap with each other, and thus overlap flag of a node indicating the bounding box is set to "1" or the second value.

The bounding box L1 includes a bounding box R2 and a bounding box L2. Since the bounding box R2 and the bounding box L2 do not overlap with each other, overlap flag of a node indicating the bounding box L1 is set to "1" or the second value.

The bounding box L2 includes a bounding box R4 and a bounding box L4. Since the bounding box R4 and the bounding box L4 overlap with each other, overlap flag of a node indicating the bounding box L2 is set to "0" or the first value.

The bounding box R1 includes a bounding box R3 and a bounding box L3. Since the bounding box R3 and the bounding box L3 do not overlap with each other, overlap flag of a node indicating the bounding box R1 is set to "1" or the second value.

While rectangular boxes are shown in FIG. 7 for illustrative purposes, those skilled in the art recognizes that various different shapes and 3D volumes may be used to define a bounding box around a set of objects, and such different shapes are within the scope of the present disclosure. In another example, a bounding box may be a cuboid including objects located in a 3D space. When a 3D space is divided by using a bounding volume hierarchy (BVH), bounding boxes may overlap with one another as shown in FIG. 7.

The acceleration structure generating apparatus 200 may generate an acceleration structure in which overlaps between bounding boxes are marked.

Figure 8:
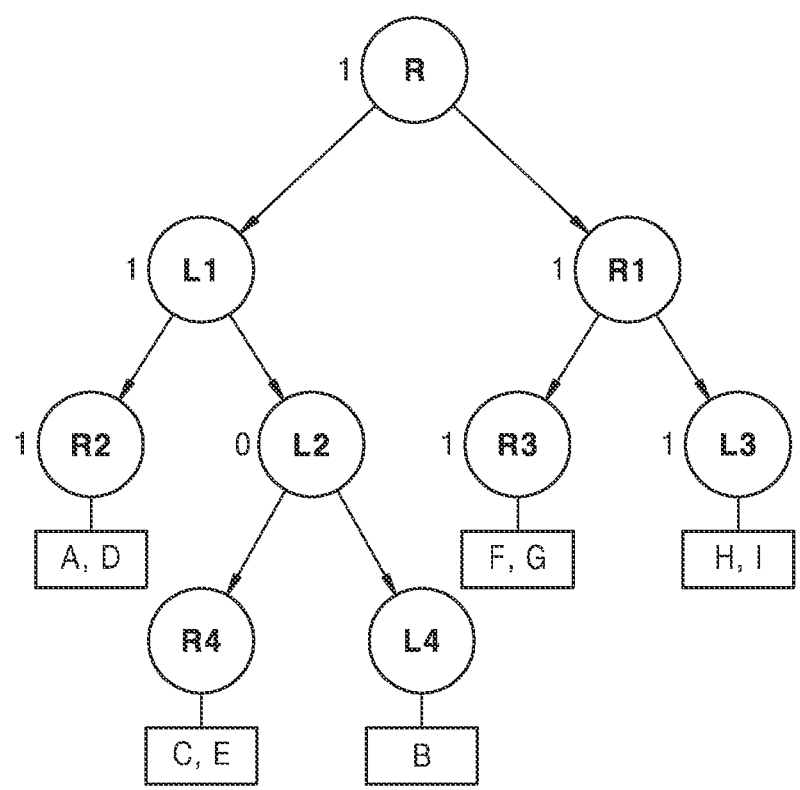
FIG. 8 is a diagram illustrating an example of an acceleration structure according to the present disclosure.

FIG. 8 is a diagram for describing an example of an acceleration structure according to the present disclosure. Referring to FIG. 8, the acceleration structure generating apparatus 200 may generate an acceleration structure in which overlaps between bounding boxes are marked. The acceleration structure shown in FIG. 8 indicates relationships between the bounding boxes of FIG. 7, where each node in the acceleration structure includes an overlap flag. Overlap flags are indicated with numbers in the left side of the nodes.

A node R denotes the root node and corresponds to the bounding box ROOT of FIG. 7. The node R is the uppermost node and includes a child node R1 and a child node L1. Since the node R1 and the node L1 do not overlap each other, an overlap flag of the node R is 1.

The node L1 includes a child node R2 and a child node L2. Since the node R2 and the node L2 do not overlap each other, an overlap flag of the node L1 is set to "1."

The node L2 includes a child node R4 and a child node L4. Since the node R4 and the node L4 overlap each other, an overlap flag of the node R1 is set to "0." The acceleration structure generating apparatus 200 sets an overlap flag of the node L2 to 0 to mark that the child nodes thereof overlap each other.

The node R1 includes a child node R3 and a child node L3. Since the node R3 and the node L3 do not overlap each other, an overlap flag of the node R1 is set to "1."

Figure 9:
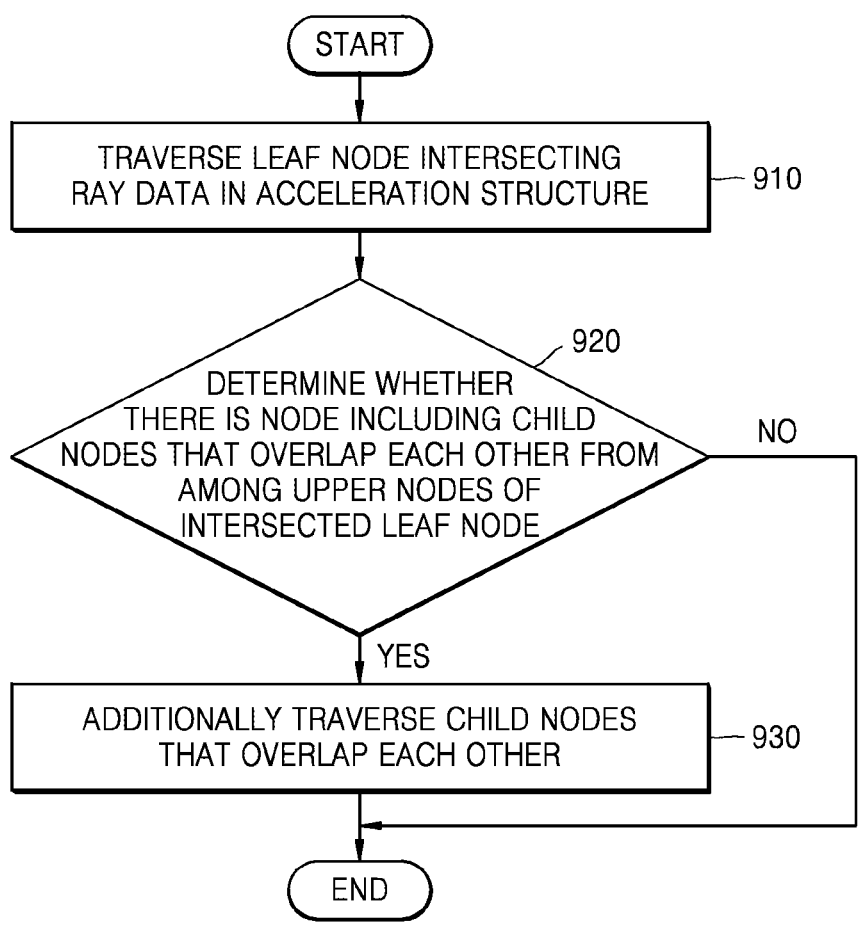
FIG. 9 is a flowchart illustrating an example of a method of traversing an acceleration structure according to the present disclosure.

FIG. 9 is a flowchart for describing an example of a method of traversing an acceleration structure according to the present disclosure. Referring to FIG. 9, the ray tracing core 100 may traverse an acceleration structure based on overlaps between nodes.

In an operation 910, the ray tracing core 100 traverses a leaf node in an acceleration structure which intersects ray data. The leaf node is the lowermost node in a tree-like acceleration structure. The ray tracing core 100 may also traverse an object, from among objects belonging to the intersecting leaf node, which intersects ray data.

The ray tracing core 100 sequentially traverses an acceleration structure from the root node to a leaf node. When the ray tracing core 100 traverses a tree-like acceleration structure, the ray tracing core 100 may traverse first a near node, push a far node to a stack, and traverse the far node after the traversal of the near node.

In an operation 920, the ray tracing core 100 determines whether a node among nodes above the intersecting leaf node includes child nodes that overlap each other. In other words, the ray tracing core 100 determine whether an overlap flap of a node from among traversed nodes is set to "0." A node of which overlap flag is set to "0" includes overlapped child nodes. If there is a node of which overlap flag is set to "0" from among traversed nodes, the method proceeds to an operation 930. If overlap flag of every node in a traversed path is set to "1" and there is an object intersecting ray data from among objects belonging to the final leaf node, traversal of the acceleration structure is terminated at this point.

In the operation 930, the ray tracing core 100 additionally traverses overlapped child nodes. The ray tracing core 100 additionally traverses child nodes that are not traversed while the intersecting leaf node is being traversed.

Figure 10:
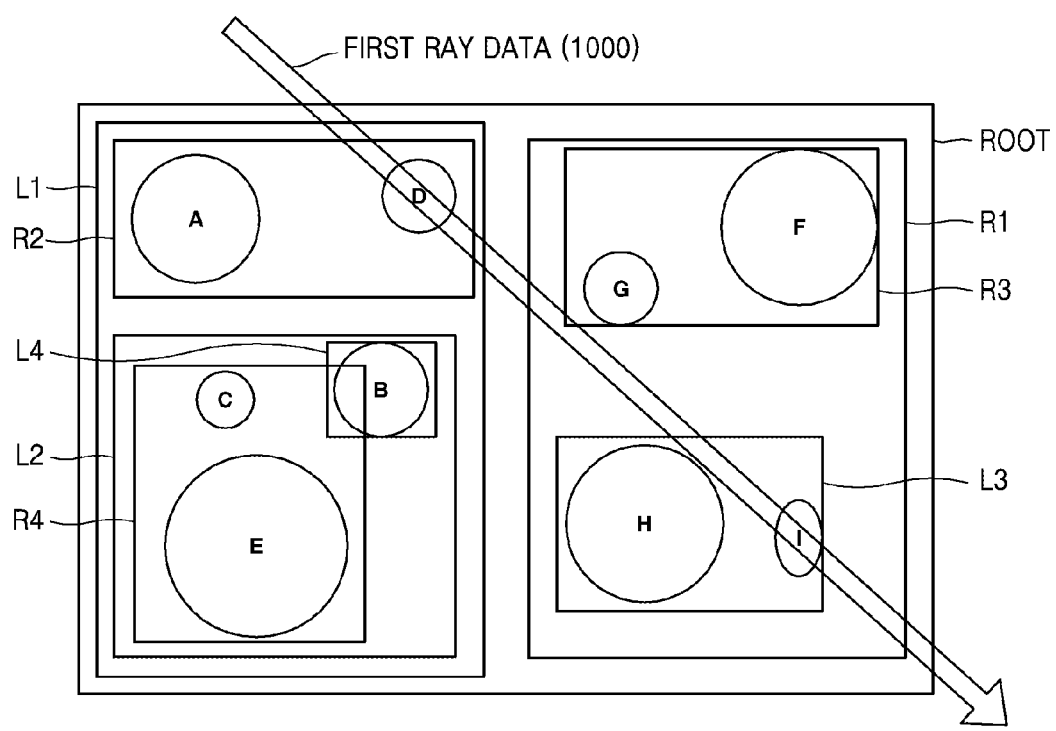
FIG. 10 is a diagram illustrating an example of a traversing operation.

FIG. 10 is a diagram describing an example of a traversing operation. First ray data 1000 intersects bounding boxes and objects in a 3D space. In case of FIG. 11, the first ray data 1000 intersects a bounding box ROOT, a bounding box L1, a bounding box R1, a bounding box R2, and a bounding box L3. Furthermore, the first ray data 1000 intersects an object D and an object I.

Figure 11:
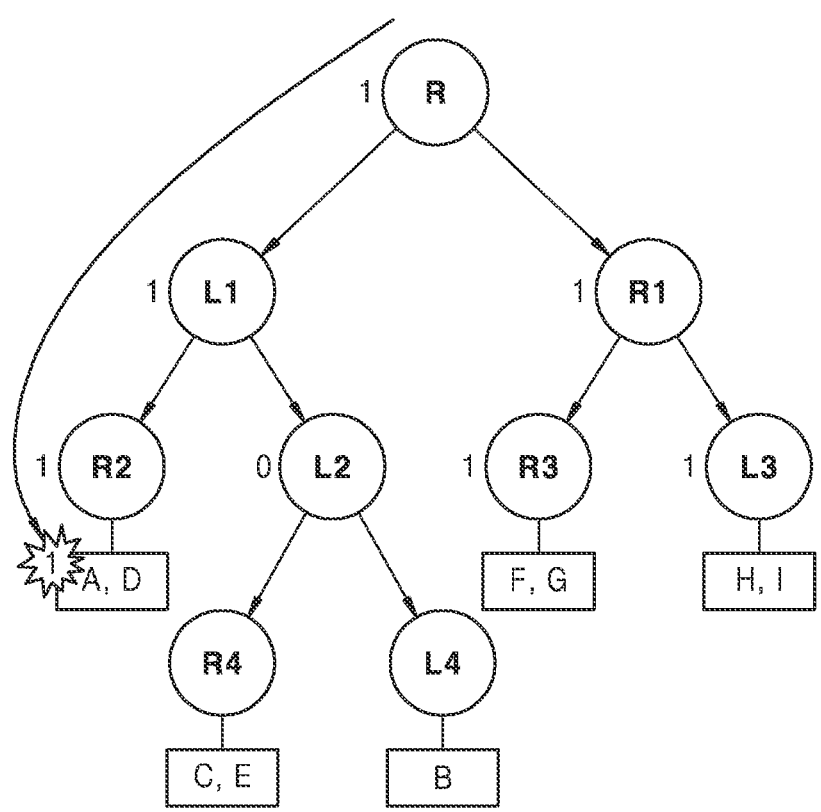
FIG. 11 is a diagram illustrating an example of a method of traversing an acceleration structure according to the present disclosure.

FIG. 11 is a diagram describing an example of a method of traversing an acceleration structure according to the present disclosure. Referring to FIG. 11, the ray tracing core 100 may terminate traversal of an acceleration structure early by referring to an overlap flag. The nodes shown in FIG. 11 correspond to the bounding boxes shown in FIG. 10.

The ray tracing core 100 determine whether a root node R and the first ray data 1000 intersect each other. The ray tracing core 100 may determine whether the root node R and the first ray data 1000 intersect each other by determining whether the bounding box ROOT and the first ray data 1000 intersect each other. Referring to FIG. 10, the bounding box ROOT and the first ray data 1000 intersect each other.

Since the child nodes R1 and L1 of the root node R do not overlap each other, overlap flag of the root node R is set to "1." The ray tracing core 100 traverses a near node, which is the node L1, from the root node. The ray tracing core 100 pushes the node R1 to a stack and stores the node R1. Therefore, the ray tracing core 100 may later pops the node R1 stored in the stack and traverses the node R1. Popping the node R1 stored in the stack refers to reading out data stored in the stack and deleting the data from the stack. In other words, the data is deleted in the stack, but a data processing unit receives and processes the data.

The ray tracing core 100 determine whether the node L1 and the first ray data 1000 intersects with one another. The ray tracing core 100 may determine whether the node L1 and the first ray data 1000 intersects with one another by determining whether the bounding box L1 and the first ray data 1000 intersect with each other. Referring to FIG. 10, the bounding box L1 and the first ray data 1000 intersect with each other.

Since the child nodes R2 and L2 of the node L1 do not overlap with each other, overlap flag of the node L1 is set to "1." The ray tracing core 100 traverses a near node, which is the node R2, from the node L1. The ray tracing core 100 pushes the node L2 to the stack and stores the node L2. Therefore, the ray tracing core 100 may later pops the node L2 stored in the stack and traverses the node L2.

The ray tracing core 100 determine whether the node R2 and the first ray data 1000 intersects each other. The ray tracing core 100 may determine whether the node R2 and the first ray data 1000 intersects each other by determining whether the bounding box R2 and the first ray data 1000 intersect each other. Referring to FIG. 10, the bounding box R2 and the first ray data 1000 intersect each other.

The ray tracing core 100 determine whether an object A, an object D, and the first ray data 1000 intersect one another. Referring to FIG. 10, the object D and the first ray data 1000 intersect each other.

Since the ray tracing core 100 has traversed the intersected leaf node R2 and the intersected object D, it is determined whether a node from among upper nodes includes child nodes overlapping with each other. Upper nodes of the leaf node R2 are the node R and the node L1. The ray tracing core 100 may search for a node including child nodes overlapping each other by searching for a node of which overlap flag is 0. Since an overlap flag of both the node R and the node L1 is 1, there is no node from among upper nodes of the leaf node R2 that includes child nodes overlapping with each other. Therefore, the ray tracing core 100 may no longer traverse a node and terminate the traversal with respect to the first ray data 1000. When the ray tracing core 100 terminates traversal with respect to the first ray data 1000, the ray tracing core 100 pops nodes stored in a stack, but does not traverses the nodes.

Figure 12:
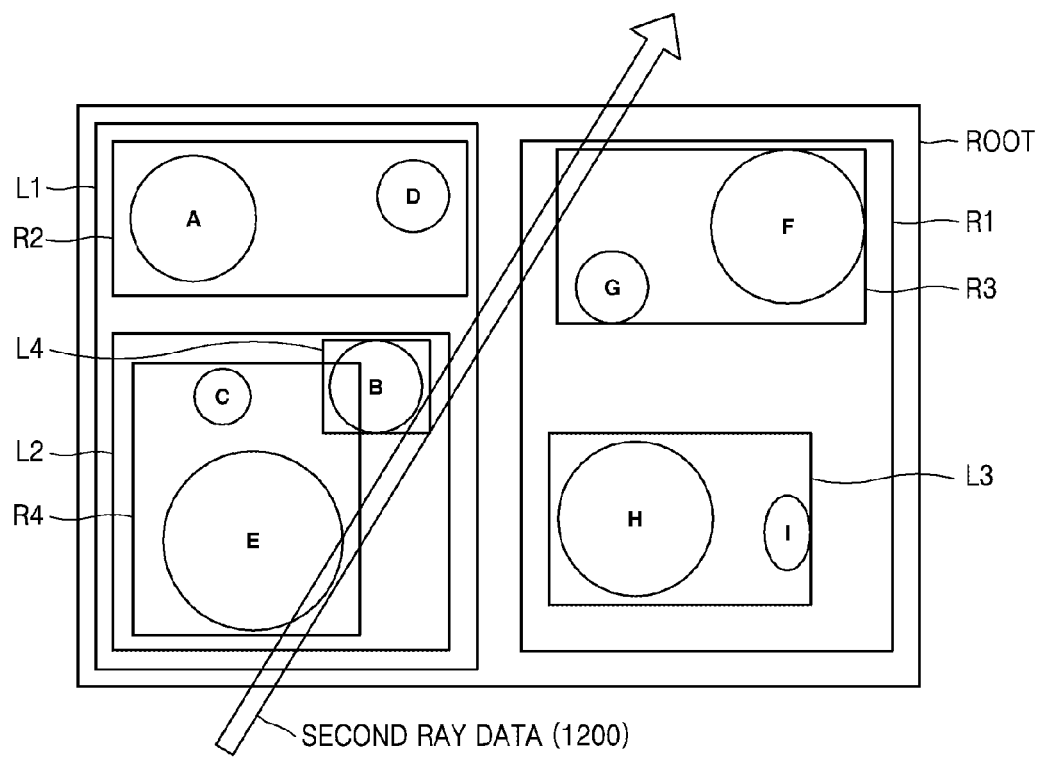
FIG. 12 is a diagram illustrating an example of a traversal process.

FIG. 12 is a diagram for describing an example of a traversal process. Second ray data 1200 intersects bounding boxes and objects in a 3D space. In the example illustrated in FIG. 12, the second ray data 1200 intersects a bounding box ROOT, a bounding box L1, a bounding box R1, a bounding box R3, a bounding box R4, a bounding box L2, and a bounding box L4. Furthermore, the second ray data 1200 intersects an object E.

Figure 13:
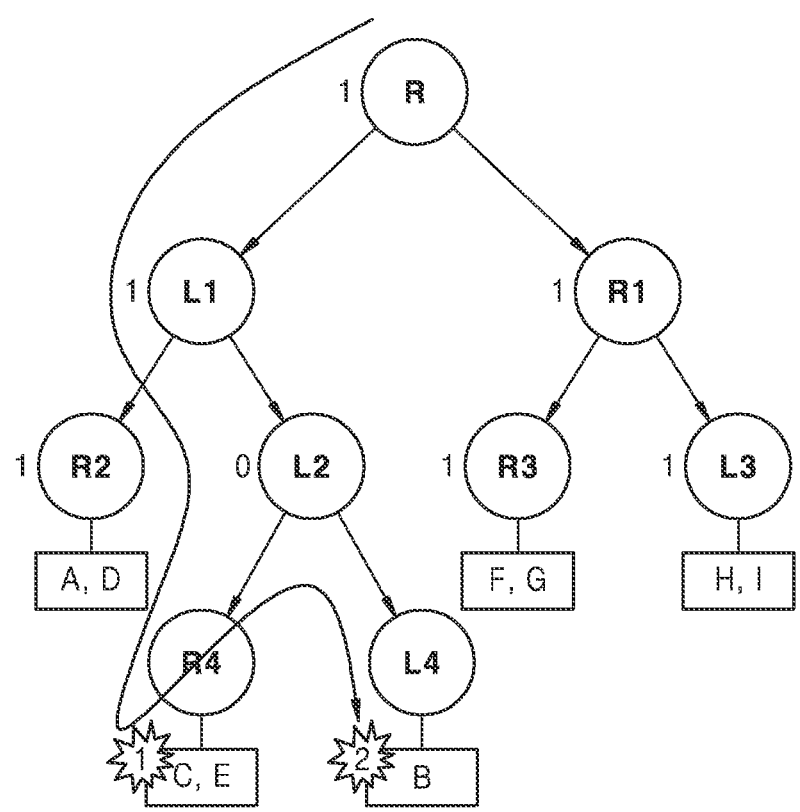
FIG. 13 is a diagram illustrating an example of a method of traversing an acceleration structure according to the present disclosure.

FIG. 13 is a diagram for describing an example of a method of traversing an acceleration structure according to the present disclosure. Referring to FIG. 13, the ray tracing core 100 may additionally traverse overlapped nodes with reference to overlap flags thereof. Nodes of FIG. 13 indicate bounding boxes of FIG. 12, respectively.

The ray tracing core 100 traverses through the root node R, the node L1, and the node L2 and determines whether each of the root node R, the node L1, the node L2, and the leaf node R4 intersect with each other in the order stated. Nodes that are not traversed are stored in a stack. The second ray data 1200 intersects all of the root node R, the node L1, the node L2, and the node R4. The ray tracing core 100 determines whether an object C and an object E belonging to the leaf node R4 intersect the second ray data 1200. The second ray data 1200 intersects the object E.

The ray tracing core 100 traverses a node including child nodes that overlap each other from among upper nodes of the intersected leaf node R4. The ray tracing core 100 may determine whether child nodes overlap each other based on overlap flags of the upper nodes of the leaf node R4. The upper nodes of the leaf node R4 are the node L2, the node L1, and the node R. From among the upper nodes, since overlap flag of the node L2 is 0, child nodes R4 and L4 of the node L2 overlap each other. Therefore, the ray tracing core 100 determines whether the leaf node L4 and the second ray data 1200 intersect with each other. Although the second ray data 1200 and the bounding box L4 intersect with each other, the second ray data 1200 and the object B do not intersect with each other. Since there is no more nodes that overlap one another, the ray tracing core 100 terminates traversal.

The ray tracing core 100 may determine whether there is an additional node to be traversed based on overlap flags of respective nodes. In the event that there is no additional node to be traversed or in the event that all additional nodes are traversed, the ray tracing core 100 may terminate the traversal with respect to the second ray data 1200.

Figure 14:
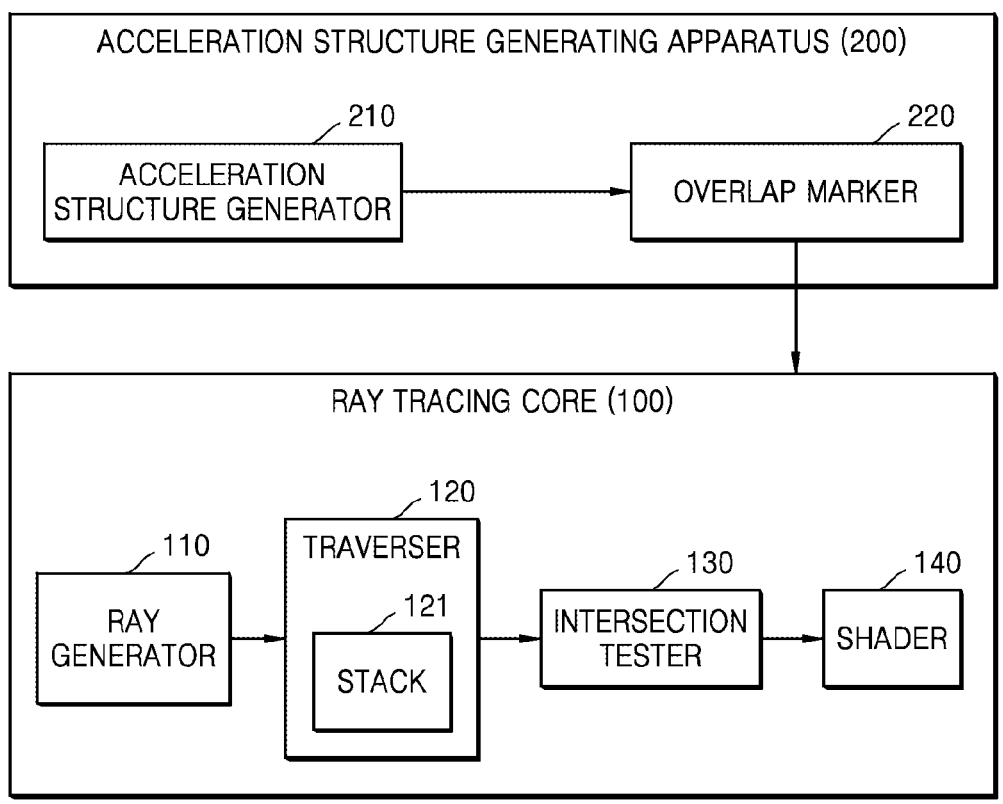
FIG. 14 is a diagram illustrating an example of an acceleration structure generating apparatus and a ray tracing core, according to the present disclosure.

FIG. 14 is a diagram describing an example of the acceleration structure generating apparatus 200 and the ray tracing core 100. Referring to FIG. 14, the acceleration structure generating apparatus 200 includes an acceleration structure generator 210 and an overlap marker 220. The acceleration structure generator 210 and the overlap marker 220 may include one or more processor.

The acceleration structure generator 210 divides objects included in a 3D space into bounding boxes and generates an acceleration structure indicating inclusion relationships between bounding boxes by using nodes. Dividing objects into bounding boxes may refer to generating a bounding box including at least one object and generating at least one upper bounding box including at least one bounding box. A bounding box may be generated as a cuboid. The acceleration structure refers to a tree-like expression of inclusion relationships between bounding boxes.

The overlap marker 220 determines overlapping nodes among the nodes of the acceleration structure and marks appropriate nodes with overlap information. For example, the overlap marker 220 allocates an additional flag to each of the nodes in the generated acceleration structure. The overlap marker 220 marks whether child nodes of a node overlap each other to the flag. In other words, the overlap marker 220 indicates overlap information at the closest upper nodes to nodes indicating bounding boxes overlapping each other.

The ray tracing core 100 includes the traverser 120, and the traverser 120 includes a stack.

The traverser 120 traverses a leaf node intersecting ray data in an acceleration structure. If there is no node including child nodes overlapping each other from among upper nodes of the intersected leaf node, the traverser 120 terminates traversal. If there is a node including child nodes overlapping each other from among upper nodes of the intersected leaf node, the traverser 120 additionally traverses the child nodes overlapping each other.

The traverser 120 may determine whether a node includes child nodes overlapping with each other based on overlap flag of the node.

When the traverser 120 additionally traverses child nodes overlapping with each other, the traverser 120 may sequentially pop nodes stored in a stack 121 and additionally traverses child nodes overlapping each other. The traverser 120 may skip and not traverse nodes that do not overlap one another among the nodes popped from the stack 121. In other words, after the traverser 120 finds an intersected leaf node, the traverser 120 does not traverse nodes that do not overlap each other from among nodes popped from the stack 121 and terminates traversal.

The traverser 120 pushes untraversed nodes to the stack 121 and stores the untraversed nodes. When the traverser 120 traverses a tree-like acceleration structure, the traverser 120 selects a first path and stores nodes in a second path that is not selected. Based on a result of traversing nodes in the first path and overlapping of the nodes in the first path, the traverser 120 may either additionally traverse nodes stored in the stack 121 or terminate traversal.

The stack 121 stores nodes. The stack 121 either stores nodes or outputs stored nodes based on a request of the traverser 120. The stack 121 stores nodes by storing data corresponding to the nodes. Nodes include data regarding bounding boxes respectively corresponding to the nodes.

Figure 15:
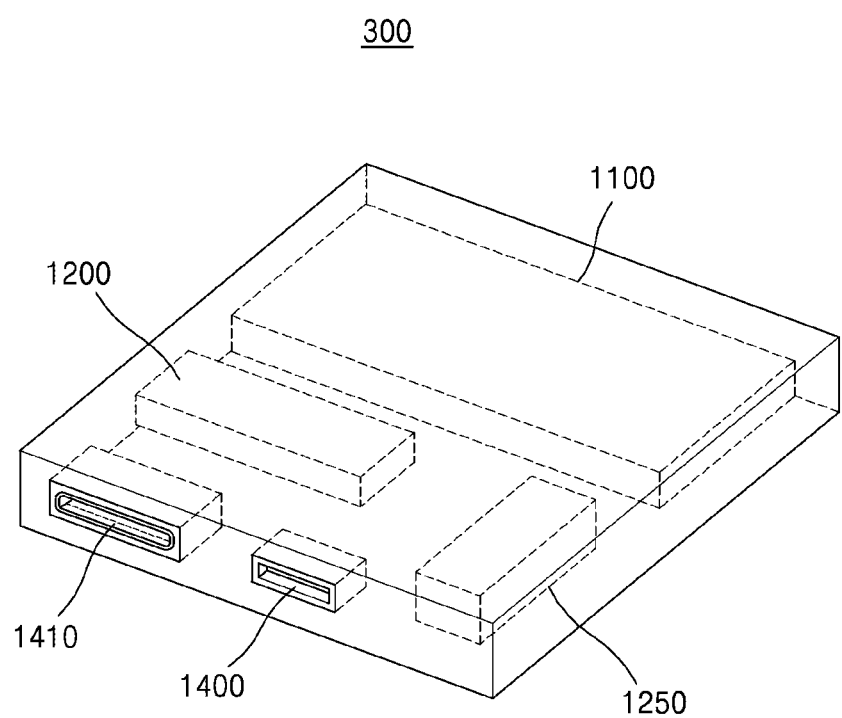
FIG. 15 is a perspective view illustrating an example of a ray tracing chip according to the present disclosure.

FIG. 15 illustrates an example of a ray tracing chip that includes a ray tracing core.

Referring to FIG. 15, the ray tracing chip 300 includes a ray tracing core 1100, an acceleration structure generating apparatus 1200, a memory 1250, a graphic data input/output port 1400, and an image output port 1410. The ray tracing chip 300 may include various additional components that are not illustrated. Further, in another example, various illustrated components can be integrally formed or provided outside of the chip.

Descriptions of the ray tracing core 100, the external memory 250, and the acceleration structure generating apparatus 200 provided with reference to FIGS. 2-14 apply to the ray tracing core 1100, the acceleration structure generating apparatus 1200, and the memory 1250 illustrated in FIG. 15; thus, repetitive descriptions thereof are omitted.

The acceleration structure generating apparatus 1200 may obtain scene data, including 3D object data regarding objects in a scene from an external source via the graphic data input/output port 1400. The acceleration structure generating apparatus 1200 may generate an acceleration structure in the form of a KD tree based on the 3D object data, and may mark the nodes of the acceleration structure with an overlap flag. The generated acceleration structure may be stored in the memory 1250. The ray tracing core 1100 may retrieve the acceleration structure from the memory 1250 and render an image by traversing the acceleration structure. After post processing of the image, the rendered image may be output through the image output port 1410. For example, the image output port 1410 can be an HDMI port that connects to a display device.

While an example of a ray tracing chip in which the acceleration structure generating apparatus 1200 and the memory 1250 are housed with the ray tracing core 1100 is provided in FIG. 15, the present disclosure is not limited thereto. The illustrated example is provided for the purpose of furthering the understanding of the ray tracing technique, and is not intended to limit the scope of any claims. Further, those skilled in the field would readily perceive variations in the types of components used, arrangements of output/input ports, and the connections and arrangements of various components, and such variations are within the scope of the present disclosure.

As described above, according to the one or more of the above embodiments of the present disclosure, an acceleration structure indicating overlapping of bounding boxes by using flags may be generated.

Also, it may be determined whether to additionally traverse the acceleration structure based on overlapping of bounding boxes, thereby reducing the computational time for traversal of the acceleration structure.

Provided are methods and apparatuses for terminating traversal of an acceleration structure early to reduce additional traversals.

In addition, other embodiments of the present disclosure can also be implemented through computer readable code/instructions in/on a medium, e.g., a computer readable medium, to control at least one processing element to implement any above described embodiment. The medium can correspond to any medium/media permitting the storage and/or transmission of the computer readable code. The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs).

The various units, apparatus, modules, elements, generators, traversers, intersection testers, shaders, and overlap markers that perform the various operations described above with respect to FIGS. 1-14 may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating an acceleration structure in a ray tracing system to generate object data for display of objects seen from a viewpoint of a camera, the method comprising:
assigning the objects into bounding boxes;
generating an acceleration structure comprising nodes, the acceleration structure indicating inclusion relationships between the bounding boxes; and
marking overlapping nodes among the nodes by adding a flag to each of the nodes, wherein the flag of a node among the nodes indicates whether child nodes of the node correspond to overlapping bounding boxes among the bounding boxes, and indicating overlap information at an upper node closest to the child nodes indicating the overlapping bounding boxes.

2. The method of claim 1, further comprising:
receiving 3D object data regarding the objects from a first non-transitory memory; and
storing the acceleration structure in which the overlapping nodes are marked in a second non-transitory memory.

3. The method of claim 1, wherein the marking of the overlapping nodes comprises:
determining whether child nodes of the node overlap each other;
upon determining that child nodes of the node do not overlap each other, setting the flag to a first value; and
upon determining that child nodes of the node do overlap each other, setting the flag to a second value.

4. A method of traversing an acceleration structure in a ray tracing system to process object data for display of objects seen from a viewpoint of a camera, the method comprising:
traversing to a leaf node of the acceleration structure, the leaf node intersecting ray data;
determining whether a parent node of the leaf node includes child nodes that overlap each other, based on an overlap flag of the parent node indicating whether the child nodes correspond to overlapping bounding boxes;
in response to determining that no parent node of the leaf node includes child nodes that overlap each other, terminating the traversing; and
in response to determining that a parent node of the leaf node does include child nodes that overlap each other, traversing the child nodes that overlap each other.

5. The method of claim 4, wherein the traversing to a leaf node comprises pushing an untraversed node to a stack and storing the untraversed node in the stack.

6. The method of claim 5, wherein the traversing of the child nodes that overlap each other comprises sequentially pushing out nodes stored in the stack to traverse the child nodes that overlap each other from among the pushed out nodes.

7. The method of claim 6, wherein nodes among the pushed out nodes that do not include overlapping child nodes are not traversed.

8. A device for generating an acceleration structure for a ray tracing system to generate object data for display of objects seen from a viewpoint of a camera, the device comprising:
an acceleration structure generator configured to assign the objects into bounding boxes and to generate an acceleration structure comprising nodes, the acceleration structure indicating inclusion relationships between the bounding boxes; and
an overlap marker configured to mark overlapping nodes among the nodes by adding a flag to each of the nodes, wherein the flag of a node among the nodes indicates whether child nodes of the node correspond to overlapping bounding boxes among the bounding boxes, and the overlap marker indicates overlap information at an upper node closest to the child nodes indicating the overlapping bounding boxes.

9. A ray tracing core for traversing an acceleration structure comprising nodes in a ray tracing system to process object data for display of objects seen from a viewpoint of a camera, the ray tracing core comprising a traverser configured to traverse to a leaf node of the acceleration structure, the leaf node intersecting ray data, wherein
in response to determining that no parent node of the leaf node includes child nodes that overlap each other by corresponding to overlapping bounding boxes, the traverser terminates traversal,
in response to determining that a parent node of the leaf node does include child nodes that overlap each other by corresponding to overlapping bounding boxes, the traverser traverses the child nodes that overlap each other, and
the traverser comprises a stack for storing the nodes.

10. The ray tracing core of claim 9, wherein the traverser determines whether a node includes child nodes that overlap each other based on an overlap flag of the node.

11. The ray tracing core of claim 9, wherein the traverser is further configured to push an untraversed node into the stack and store the untraversed node in the stack.

12. The ray tracing core of claim 11, wherein, when the traverser traverses the child nodes that overlap each other, the traverser is further configured to sequentially push out nodes stored in the stack to traverse the child nodes that overlap each other from among the pushed out nodes.

13. The ray tracing core of claim 12, wherein the traverser does not traverse child nodes that do not overlap each other from among the pushed out nodes.

14. A ray tracing core in a ray tracing system to process object data for display of objects seen from a viewpoint of a camera comprising:
a processor configured to render an image by traversing an acceleration structure in which an overlapping relationship is marked according to a bounding volume hierarchy of the objects,
wherein the overlapping relationship is marked by a flag assigned to a node of the acceleration structure, the flag indicating whether child nodes of the node correspond to overlapping bounding boxes and overlap information at an upper node closest to the child nodes indicating the overlapping bounding boxes.

15. The ray tracing core of claim 14, wherein the processor is further configured to skip an undesired node during the traversing of the acceleration structure based on the overlapping relationship being marked by a flag associated with the undesired node.

* * * * *